United States Patent
Innocenzi et al.

(10) Patent No.: US 10,018,228 B2
(45) Date of Patent: Jul. 10, 2018

(54) SPLIT BOOT WITH ZIPPER CLOSURE

(71) Applicants: Mark Ercole Innocenzi, Thousand Oaks, CA (US); John B. Evans, San Juan Capistrano, CA (US); Marcus Andrew Garraway, Hawthorne, CA (US)

(72) Inventors: Mark Ercole Innocenzi, Thousand Oaks, CA (US); John B. Evans, San Juan Capistrano, CA (US); Marcus Andrew Garraway, Hawthorne, CA (US)

( * ) Notice: Subject to any disclaimer, the term of this patent is extended or adjusted under 35 U.S.C. 154(b) by 0 days.

(21) Appl. No.: 14/796,985

(22) Filed: Jul. 10, 2015

(65) Prior Publication Data

US 2017/0009815 A1   Jan. 12, 2017

(51) Int. Cl.
*F16D 3/84* (2006.01)
*F16J 3/04* (2006.01)

(52) U.S. Cl.
CPC .............. *F16D 3/845* (2013.01); *F16J 3/045* (2013.01)

(58) Field of Classification Search
CPC .................................. F16D 3/845; F16J 3/045
USPC ........................ 464/173–175; 277/634–636
See application file for complete search history.

(56) References Cited

U.S. PATENT DOCUMENTS

| 2,025,635 | A | * | 12/1935 | Bishoff | F16D 3/845 |
| | | | | | 464/173 X |
| 3,075,370 | A | * | 1/1963 | Kings | F16D 3/848 |
| | | | | | 464/173 X |
| 4,691,370 | A | * | 9/1987 | MacFee | A44B 19/34 |
| 4,813,913 | A | * | 3/1989 | Belter | F16J 3/045 |
| | | | | | 464/175 X |
| 5,182,956 | A | * | 2/1993 | Woodall | F16J 15/52 |
| | | | | | 277/636 X |
| 5,295,914 | A | * | 3/1994 | Milavec | F16D 3/845 |
| | | | | | 277/636 |
| 5,299,393 | A | * | 4/1994 | Chandler | B24B 37/12 |
| 2006/0186607 | A1 | * | 8/2006 | Shih | F16J 3/045 |
| | | | | | 277/634 |

FOREIGN PATENT DOCUMENTS

GB        2 196 396 A  *  4/1988

* cited by examiner

*Primary Examiner* — Gregory J Binda

(57) ABSTRACT

A split boot design for applications that contain Constant Velocity (CV) joints and/or other bearing assemblies where boots and/or covers are employed for, e.g., protection from the outside environment, assisting in retaining lubrication for the assembly, etc. A split boot design in accordance with an aspect of the present disclosure includes zippers along one or more axial seams, providing easier replacement of the boot and decreased manufacturing costs.

14 Claims, 8 Drawing Sheets

SPLIT BOOT WITH ZIPPER CLOSURE

BACKGROUND

1. Field of the Disclosure

The present disclosure is related to vehicular and mechanical applications, including automotive, truck, carts, ATVs, and other applications that utilize flexible covers, known as boots, to protect constant velocity (CV) joints and other types of bearing assemblies that are found in the drive train or suspensions of vehicles.

2. Description of the Related Art

A great number of cars, trucks and other vehicles use CV johns and other bearing assemblies to help transfer power through the transmission or drive train to the drive wheels. Front wheel drive vehicles and some rear wheel drive vehicles that use transaxles with half shafts, or half axles, to transfer power to the drive wheels, is one typical application. As an example, a front wheel drive car is commonly configured with two half shafts to connect the transaxle to the drive wheels. The interfaces of the half shafts to the transmission and to the drive wheels are commonly protected by a flexible boot made of rubber or other flexible material.

These boots are installed onto a half axle or similar assembly before the half axle is installed connecting the transaxle to the hub of the drive wheel. On the transaxle side, the end of the half shaft is typically a spline shaft protected by a flexible boot that is banded or clamped to the half shaft. On the wheel side, the end of the half axle contains a CV bearing joint that is protected by a similar flexible boot. The CV boot, as it is commonly called, is banded or clamped to the half axle and the wheel hub to seal in lubrication for the CV bearing joint and to keep unwanted contamination from entering the CV joint.

A CV joint is a rugged bearing joint that can last for hundreds of thousands of miles if properly sealed and lubricated. On the other hand, the protective boots typically fail after 50,000 to 100,000 miles or even sooner depending on driving conditions and exposure to other conditions or hazards that tend to break or rupture the protective boots. After the protective boot is compromised, the CV joint or other hearing type or moving joint can fail quickly once exposed to water, dirt, dust, and other contaminants.

When the protective boot is broken or compromised, the most elaborate and expensive repair involves disassembly and replacement of the half shaft with a new or remanufactured half shaft with new protective boots.

In other cases where the boot has been compromised but the bearing joint or CV joint is still functioning adequately, the damaged boot can be removed, the joint can be cleaned, re-lubricated, and another protective boot can be installed. For this type of repair, with a specially designed "split boot," the half shaft can remain in place, which reduces the parts and labor costs of the required repair.

To this end, there are two styles of split boots that are available on the market for protective boot replacement. There are also designs that have been presented for a third style of split boot with a zipper, but none of these prior zipper designs have ever been produced, to our knowledge. The first of the two styles involves a rubber or other flexible material that is made with a split or axial slit in the boot to allow installation of the protective boot over the half shaft while the half shaft remains in place (connected at both ends). This style requires very small nuts and bolts that catch small tabs along the split to hold the seam together once the boot is installed onto the half shaft, Once the seam is bolted up, the split boot is clamped on both the half axle side and the wheel or transaxle side to finish the protective sealing of, the joint.

The biggest drawback with this style of boot is that the bolted split or seam is typically not a good environmental seal since the seam or split tends to somewhat pull apart during use due to the required flexing of the protective boot. Thus, the joint lubrication and outside contamination can both move through the split, which leads to premature bearing or CV joint failure.

The second of the two styles has a split protective boot that is available on the market is a protective boot made in two halves with tongue and groove joints that are glued together with a permanent adhesive to seal the axial boot seam. This style of boot is typically a less flexible, more plastic like material that better facilitates the required gluing process. A typical installation scenario for this style of boot is to glue one of the split seams together, then install the split CV boot onto the half shaft with the remaining seam open, then glue the remaining seam together once the CV joint or bearing joint has been cleaned and re-lubricated.

While this style of split boot can result in a more environmental seal on the boot splits or seams as compared to the bolted seam split boot, it also has some notable installation and usage limitations. First, with the new grease in the bearing or CV joint and in the presence of other containments on the half shaft and in the area of the installation of the split boot, it is difficult to keep the remaining split seam free of grease, dirt, and other contaminants to allow the gluing operation to result in a good seal for the seam. If the seam is contaminated, the glue or adhesive will not properly adhere to the boot material to allow the split or seam to be successfully sealed. On some vehicles, there may be enough space to glue the remaining seam first, then, pull the boot back to grease the joint, but this may not always be the case. After the joint is greased and the boot is positioned, the boot is then clamped on both ends.

Before the boot is clamped, the multiple gluing operations for this style of split seam boot significantly slows the installation process as compared to the bolted seam type, thereby adding to labor costs. The other limitation of this style is that the material is harder and less flexible making the process of banding or clamping both ends of the boot, to complete the installation, more difficult. It is not uncommon for one or both of the end clamps to move or not seal as well as the more flexible bolted style split boot noted above. Another risk of lubrication loss or joint contamination is through the end seals of this style of boot.

In summary, neither of the available split boot designs discussed above are ideal for ease of installation and long term protection of a Constant Velocity (CV) joint and/or a bearing joint. It can be seen, then, that there is a need in the art for a different, more producible split boot design with a zipper closure to install or replace new or broken CV boots and other similar boots that protect similar interfaces or bearing assemblies while avoiding the cost of a complete removal, replacement, and reinstallation of a half shaft or other larger sub-assembly.

SUMMARY

The present disclosure describes various aspects of a design for a protective boot and/or CV boot that is a split boot style. The present disclosure describes a split boot having one axial seam that is sealed with a durable zipper, which will provide an effective seal along the axial boot split or seam. The boot design will also be fabricated from flexible material that is easy to clamp or band on each end so that both the axial seam and end seals will be environmentally sealed from moisture and dirt. This new design will allow for a durable repair that will not suffer from the limitations discussed for the currently available designs. This new design will also allow for easier and faster installation as compared to the currently available designs, thereby, reducing overall repair time and cost.

The split zipper boot design of the present disclosure comprises a flexible material like, but not limited to, rubber or neoprene that has one or more axial splits that is sealed with a durable zipper. Like many current CV boot designs, the boot assembly may be ribbed or corrugated to provide the required flexibility and bending angles required for certain boot applications, but the zipper boot is not limited solely to ribbed or corrugated designs. If ribbed, the split zipper boot will also be flexible enough to allow the boot assembly to be stretched axially to allow the zipper to be zipped to close the axial split. After the zipper is zipped, the boot assembly can return to its normal length. A more complete description of the design details of this new split boot concept is discussed in the detailed design section below.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. As described herein, the use of the term "and/or" is intended to represent an "inclusive OR", and the use of the term "or" is intended to represent an "exclusive OR".

Overview

Figure 1:
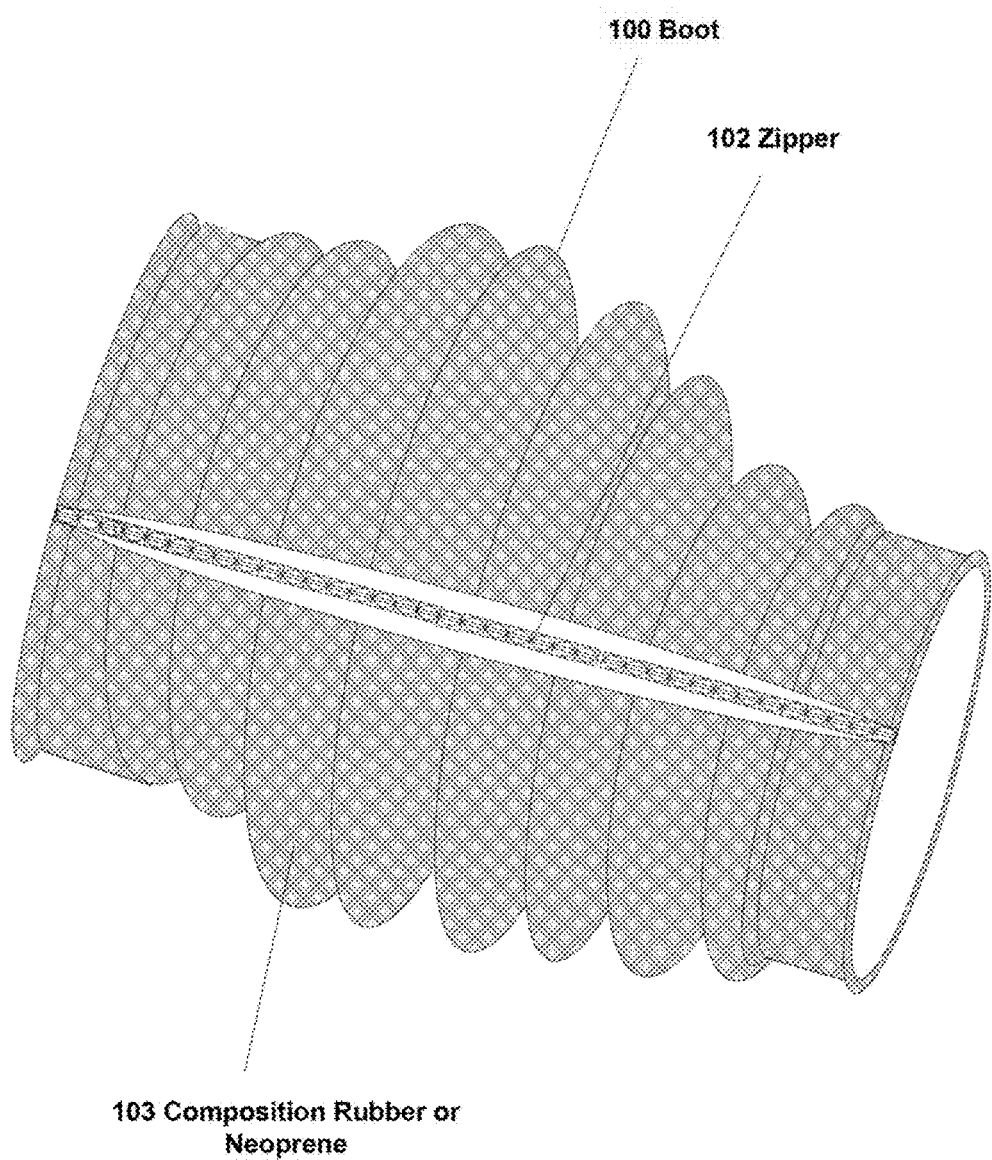
FIG. 1 illustrates a concept of design
Figure 2:
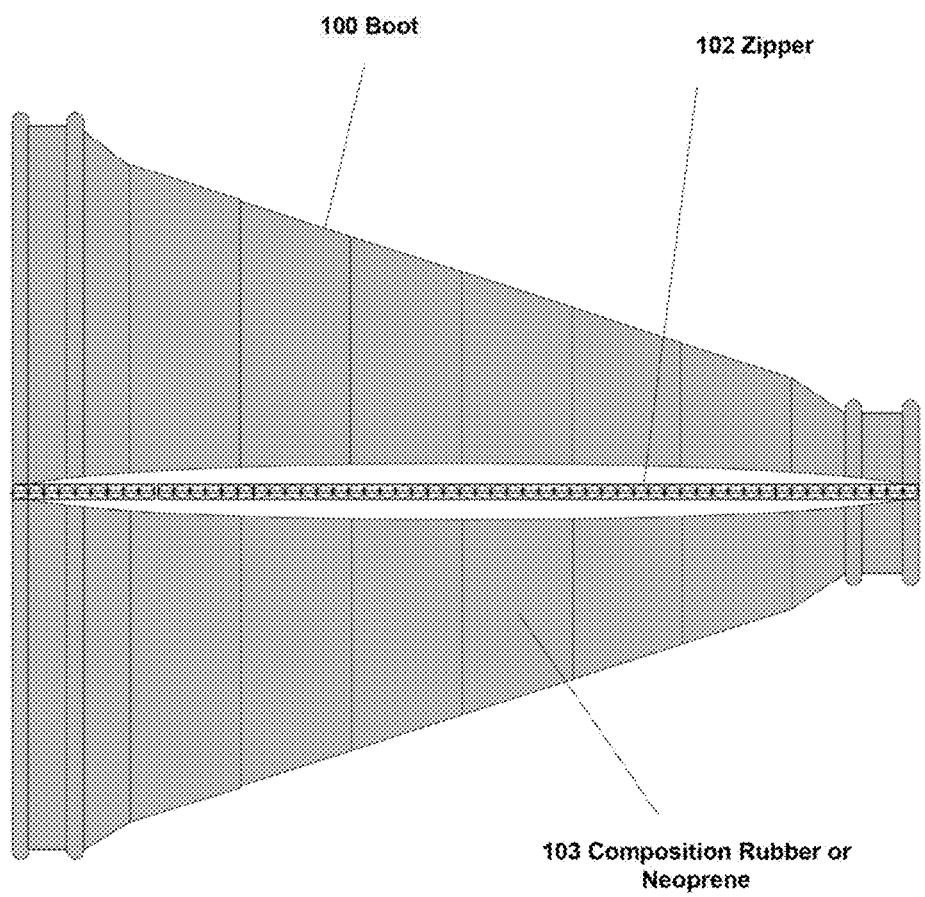
FIG. 2 illustrates a stretched or smooth boot assembly
Figure 3:
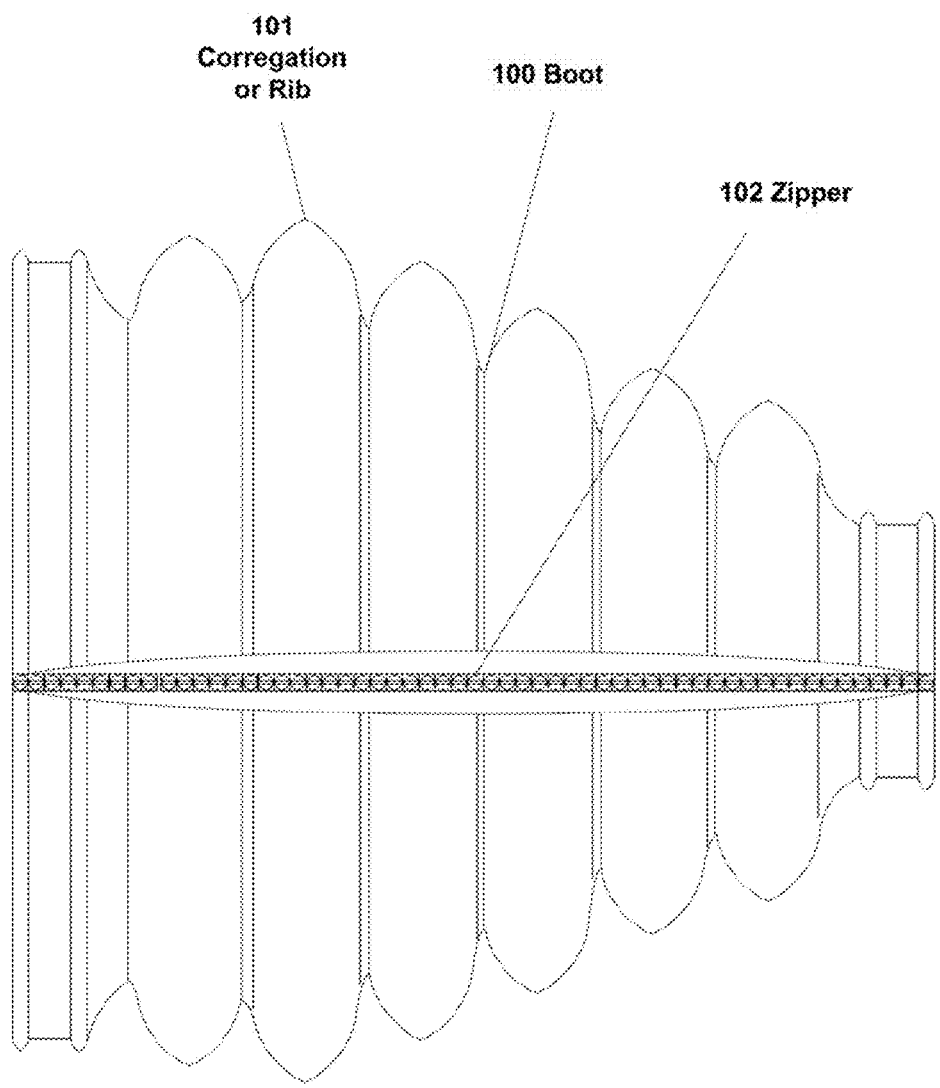
FIG. 3 illustrates a boot assembly after being zipped, in relaxed shape
Figure 4:
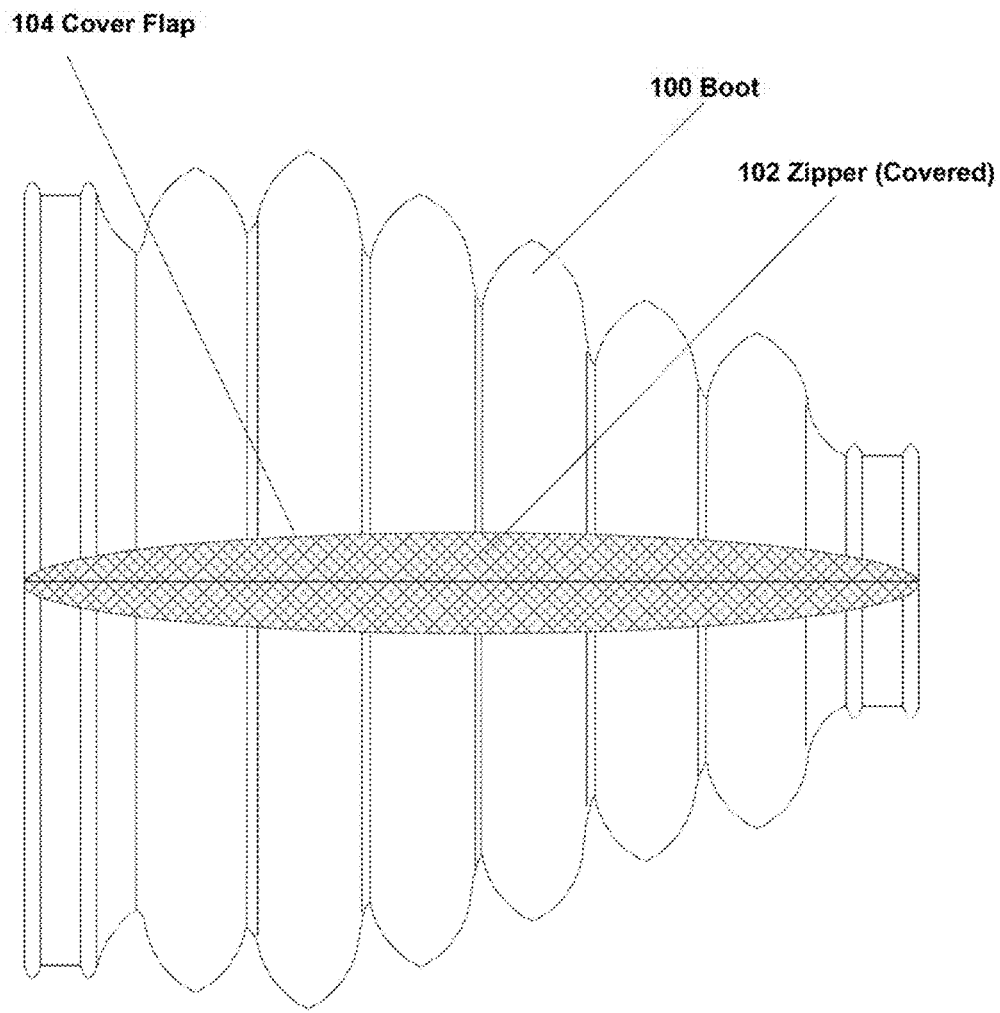
FIG. 4 illustrates a hoot assembly with protective flap after being zipped
Figure 5:
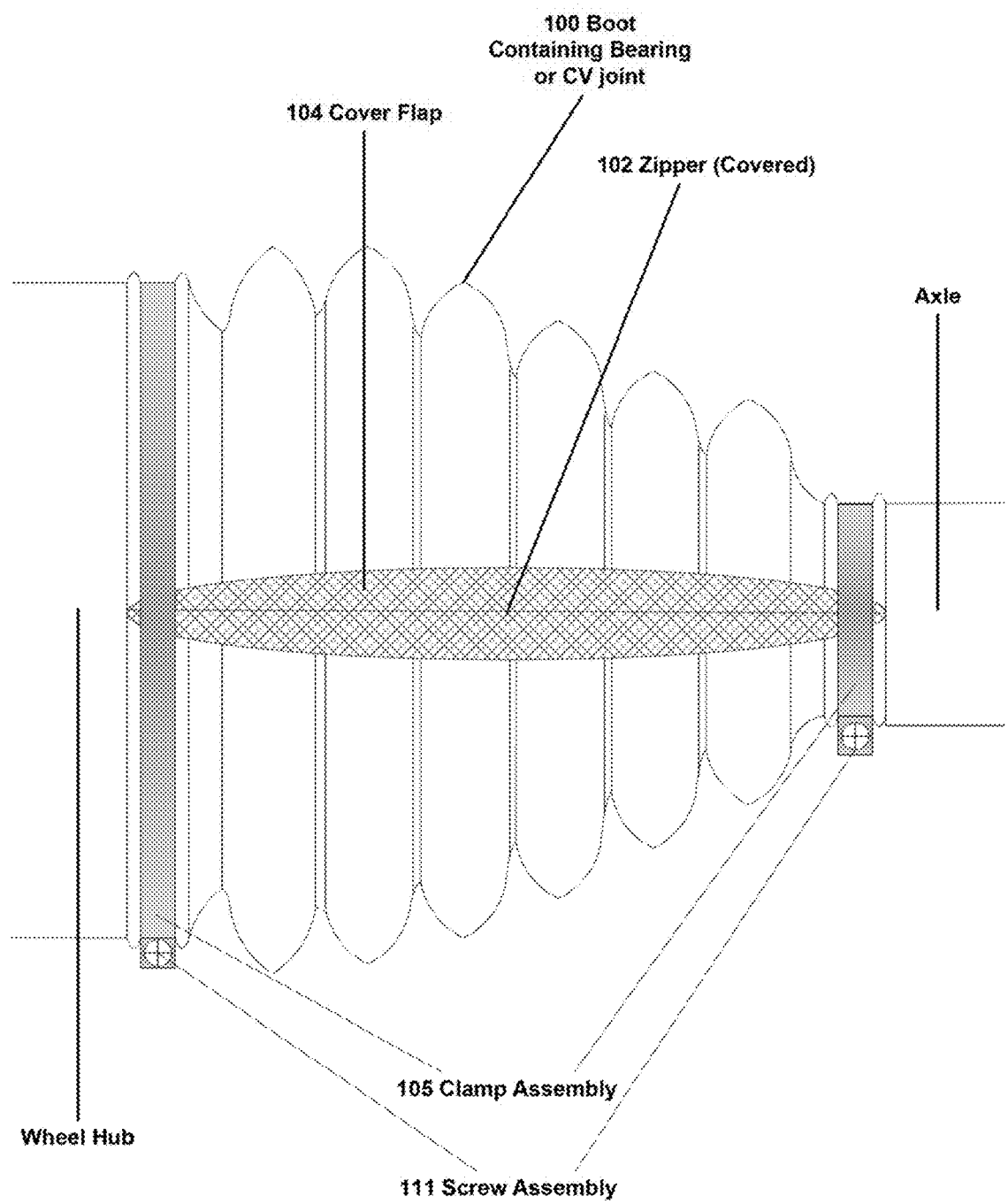
FIG. 5 illustrates a sealed boot after being clamped on ends with clamps

The split zipper CV boot design of the present disclosure is shown in FIG. 1. When the boot assembly (100) is stretched, it will appear as illustrated in FIG. 2, which will aid in zipping the zippers 102). In FIGS. 1 and 2, the composition of the entire boot is shown as rubber or neoprene (103) as indicated by the crosshatching throughout the entirety of each figure. Once the split seam zipper (102) is zipped, the boot assembly (100) can return to its relaxed state as shown in FIG. 3, if it is one of the ribbed (101) or corrugated variety. As a further protection to the split seam zipper, a fold over flap (104) can be made to cover the zipper once the split seam zipper is closed or zipped. This is illustrated in FIG. 4, Then, once the axial split or seam is sealed, the boot can be clamped on both ends with bendable, fold-over clamps or screw type aviation clamps (105). This is shown in FIG. 5. In addition, it is noted in FIG. 5 that the boot (110) contains the actual bearing or CV joint to be protected.

Design Detail

Split boots can be designed in numerous shapes and sizes. Most all of the varieties of split boots will have a seam or split, and all of the seams can potentially be sealed with a zipper. For many vehicle applications, the CV boots or beating cover boots have ribs to allow the boots to have more flexibility in the direction perpendicular to the long axis of the boot as illustrated in FIG. 1, This design is required for outer CV boots and other boots that require larger turning angles that will require more flexibility.

There are applications for inner boots, such as boots on the transaxle end (or side) of a half shaft used on vehicles with transaxles, that can be ribbed or of a smooth variety with no ribs, The smooth variety would look like the illustration shown in FIG. 2, but the boot would not be stretched to flatten the ribs. The normal appearance of the boot would be a smooth conical shape. This style of smooth boot would also be applicable to many racing applications. Further, it could easily and quickly be installed and replaced if the boot was a split boot with a zipper seam.

As mentioned above in the summary the new split zipper boot design will consist of a flexible material like, but not limited to, rubber or neoprene that has one or more axial splits that is sealed with a durable zipper. Like many current CV boot designs, the boot assembly can be ribbed to provide the required flexibility and bending angles required for some CV boot applications. If ribbed, the split zipper boot will also be flexible enough to allow the boot assembly to be stretched axially to aid in the manufacture of the boot, and to allow the zipper to be zipped to close the axial split. This is depicted in FIG. 2. After the zipper is zipped, the boot assembly can return to its normal length.

The manufacture and installation of the smooth style boot with a zipper will be easier than the ribbed style since no or minimal stretching of the boot would be required for manufacture or installation.

Figure 6:
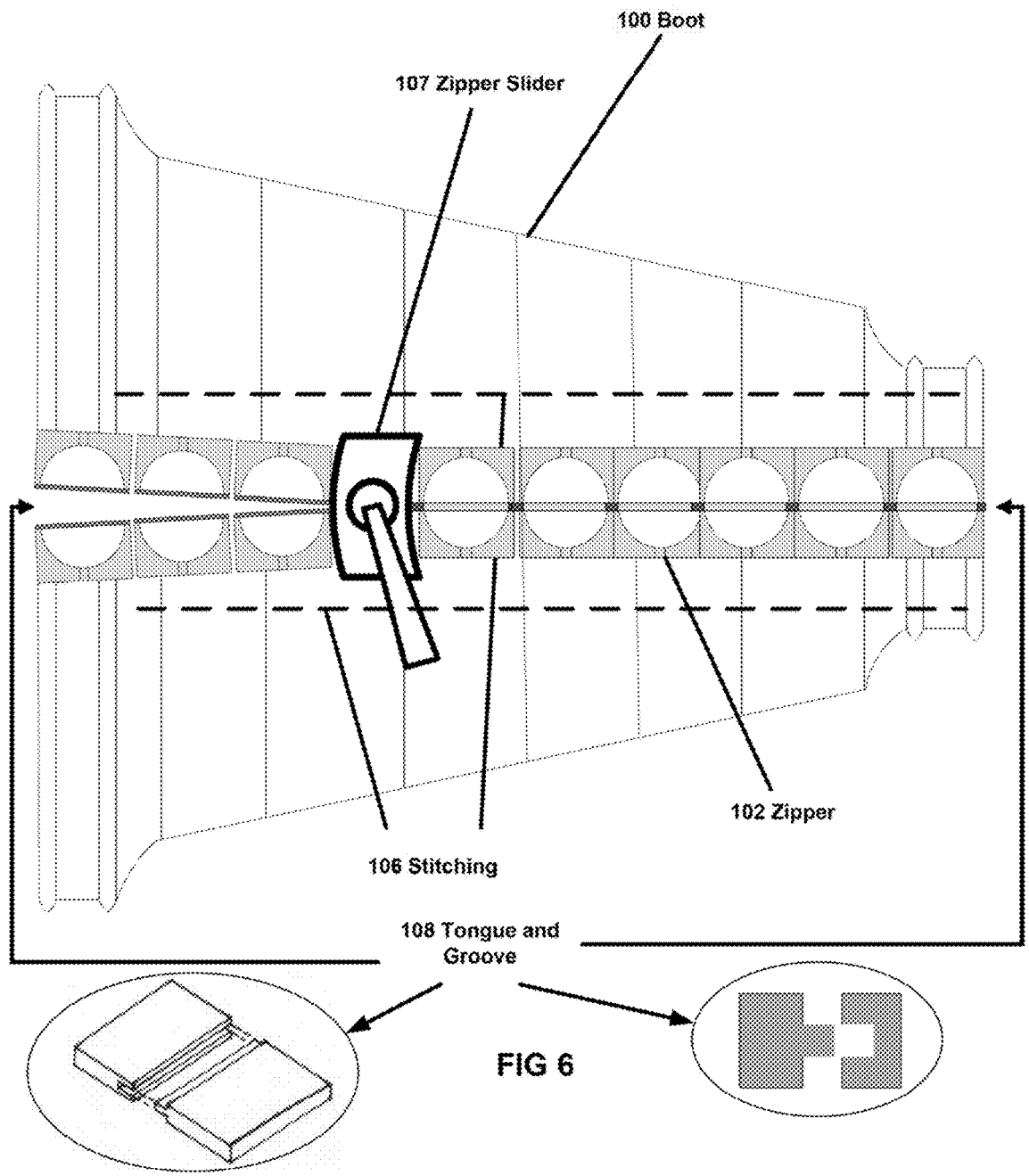
FIG. 6 illustrates a zipper that is sewn into a boot

There are preferred methods to manufacture a split CV or bearing boot with a zipper. For example, one preferred method to manufacture a split boot with a zipper would be to use a heavy duty metal, nylon or other type of zipper that has material on each side of the zipper that can be stitched or sewn (106) to the rubber or neoprene boot. This would be different than the method by which a zipper is attached to clothing or a wetsuit. This is shown in FIG. 6.

The zipper can be installed along the entire length of the axial boot split or it could be installed just short of one or both ends on each side of the boot to allow a smoother clamping surface at one or both ends. The majority of our figures depict the zipper installed to one end of the boot, but just short of the other end of the boot. As discussed, this is not the only configuration that can be conceived for the zipper. However, with the zipper installed to the end of the boot on the starting side of the zipper, this will allow for easier fastening of the zipper. With the zipper short of the end on the closing part of the zipper, this will help prevent the metal zipper slider from causing an issue when clamping the boot at that end. In FIG. 6, the right side of the figure is the open or starting part of the zipper, and the left side is the ending or closed end of the zipper.

If the zipper is installed just short of one or both ends, the remaining split will be sealed with a clamp or could be made in a tongue and groove configuration (108) to allow for a better environmental seal after being clamped. Otherwise, if the zipper is installed along the entire length of the split seam, a protective flap (104), over the zipper, as shown in FIG. 4, would also allow for a smoother clamping surface at each end. A zipper split boot that is clamped on both sides is depicted in FIG. 5. The open end and closing end of the zipper may be reversed depending on whether this is an inner boot or outer boot or due to other space constraints that would tend to limit access to the zipper. The closing end of the zipper may also require a dab of adhesive or other method to help keep the zipper from unzipping as the boot moves and flexes during normal usage.

If the manufacturing process of adding the zipper to the split seams proves difficult, for a boot of ribbed design, this may require a different seam geometry. One such alternate seam configuration would feature a valley cut (109) into the ribs along the axial seam to facilitate attaching the zipper to the hoot, and to simplifying zipping the zipper once the boot is installed. This is illustrated in FIG. 7, The valley cut out (109) is anticipated for a smooth zipper split boot design, but could also be used in that application as well.

As can be seen from currently existing split boot designs and new ones that are envisioned, the split boots can have one or more seams. All of the axial seams can use zippers as the sealing mechanism. Split boots with one seam in shown in FIGS. 1-7, while a split boot with two zipper (102) seams in illustrated in FIG. 8.

Figure 7:
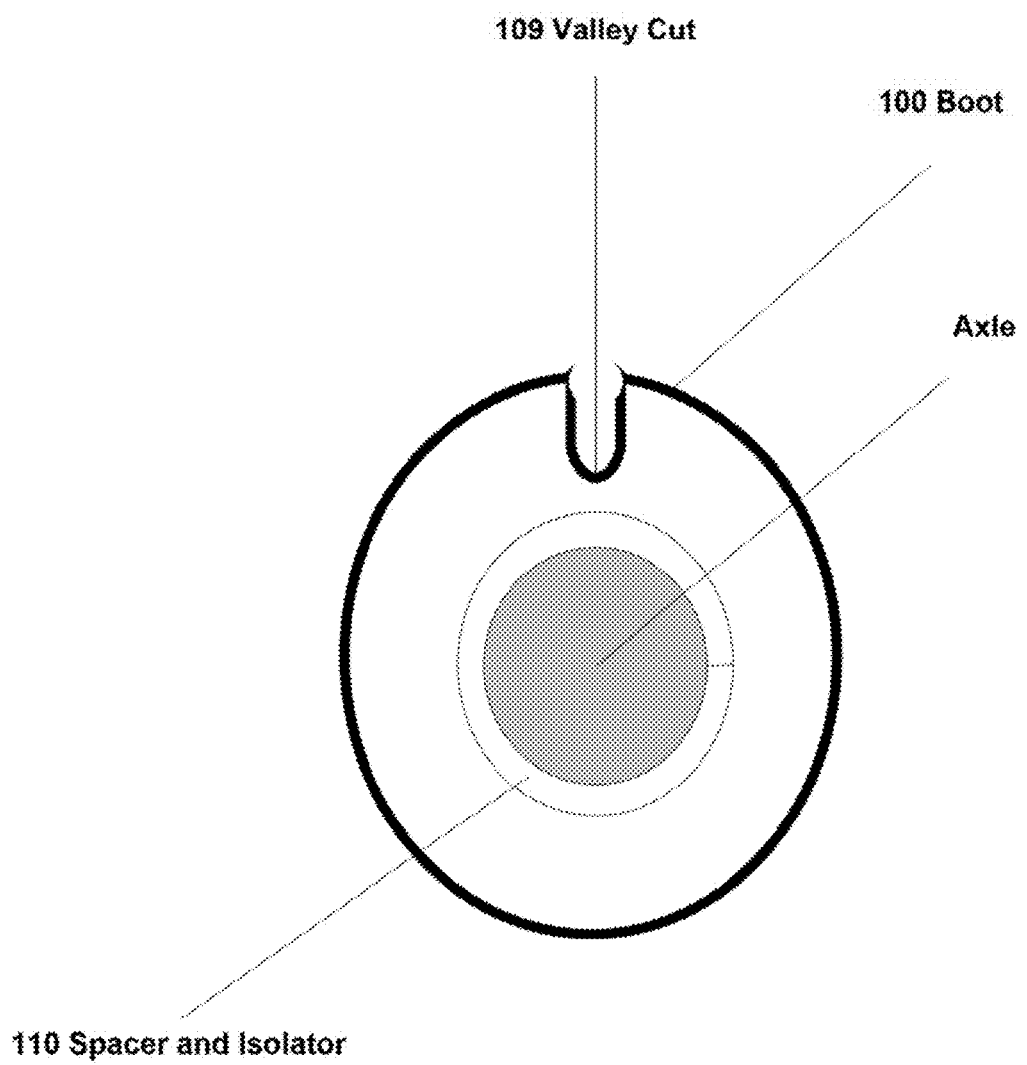
FIG. 7 illustrates an alternate design with a valley cut in the ribbing along the axial seam
Figure 8:
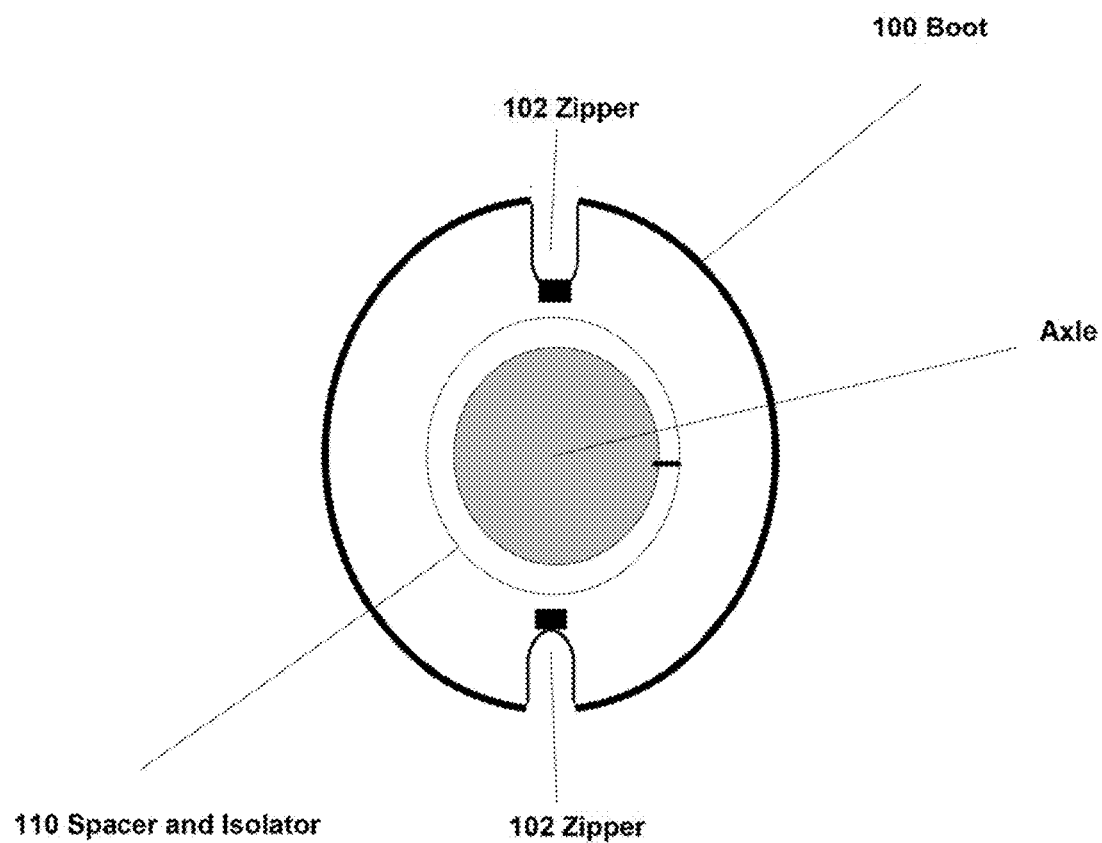
FIG. 8 illustrates an alternate design that features two axial seams and two zippers

In FIGS. 7 and 8, a split spacer/isolator (110) is shown. This part will serve to adjust the size of the opening of the boot to the axle, wheel hub, or other clamping surface, and will also provide isolation. With the spacer/isolator (110) installed, the zipper will not touch or rub the surface to which the boot is clamped. Depending on whether the zipper (102) extends to one or both ends of the boot, this part may be optional on one or both ends.

CONCLUSION

Those of skill will appreciate that the split boot design, described herein, will provide a more efficient solution for protective boot installation and/or replacement on CV joints and/or other beating assemblies for on road, off road, racing, and numerous other vehicular and mechanical applications where protective boots are required.

Skilled artisans may implement the described functionality in varying ways for each particular application, but such implementation decisions should not be interpreted as causing a departure from the scope of the present disclosure.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but are to be accorded the widest scope consistent with the principles and features disclosed herein.

What is claimed is:

1. A cover for protecting a bearing assembly, comprising:
   a boot, in which the boot comprises a flexible material, the boot including an axial seam;
   a zipper, coupled to the axial seam by sewing the zipper to the axial seam;
   one or more screw-type aviation clamps, coupled to the boot, for attaching the boot to the bearing assembly, in which the zipper is adapted to allow the cover to be directly removed from the bearing assembly; and
   a portion of the length of the boot that exceeds the length of the zipper comprises a tongue and groove configuration.

2. The cover of claim 1, in which the boot further comprises at least one corrugation to adapt the cover to the bearing assembly.

3. The cover of claim 1, in which the flexible material comprises rubber.

4. The cover of claim 1, in which the flexible material comprises neoprene.

5. The cover of claim 1, further comprising a portion of material, coupled to the hoot proximate the zipper, the portion of material adapted to reduce a passage of contaminants through the zipper.

6. The cover of claim 1, in which a length of the zipper is less than a length of the boot.

7. The cover of claim 1, in which the bearing assembly is a constant velocity (CV) bearing assembly.

8. A cover for protecting a bearing assembly, consisting essentially of:
   a boot, in which the boot comprises a flexible material, the boot including an axial seam;
   a zipper, coupled to the axial seam by sewing the zipper to the axial seam;
   one or more screw-type aviation clamps, coupled to the boot, for attaching the boot to the bearing assembly, in which the zipper is adapted to allow the cover to be directly removed from the bearing assembly; and
   a portion of the length of the boot that exceeds the length of the zipper comprises a tongue and groove configuration.

9. The cover of claim 8, in which the boot comprises at least one corrugation to adapt the cover to the bearing assembly.

10. The cover of claim 8, in which the flexible material comprises rubber.

11. The cover of claim 8, in which the flexible material comprises neoprene.

12. The cover of claim 8, further consisting essentially of: a portion of material, coupled to the boot proximate the zipper, the portion of material adapted to reduce a passage of contaminants through the zipper.

13. The cover of claim 8, in which a length of the zipper is less than a length of the boot.

14. The cover of claim 8, in which the bearing assembly is a constant velocity (CV) bearing assembly.

* * * * *